M. E. ROZE.
AUTOMATIC STEERING CONTROL.
APPLICATION FILED SEPT. 1, 1917.
1,294,174.
Patented Feb. 11, 1919.
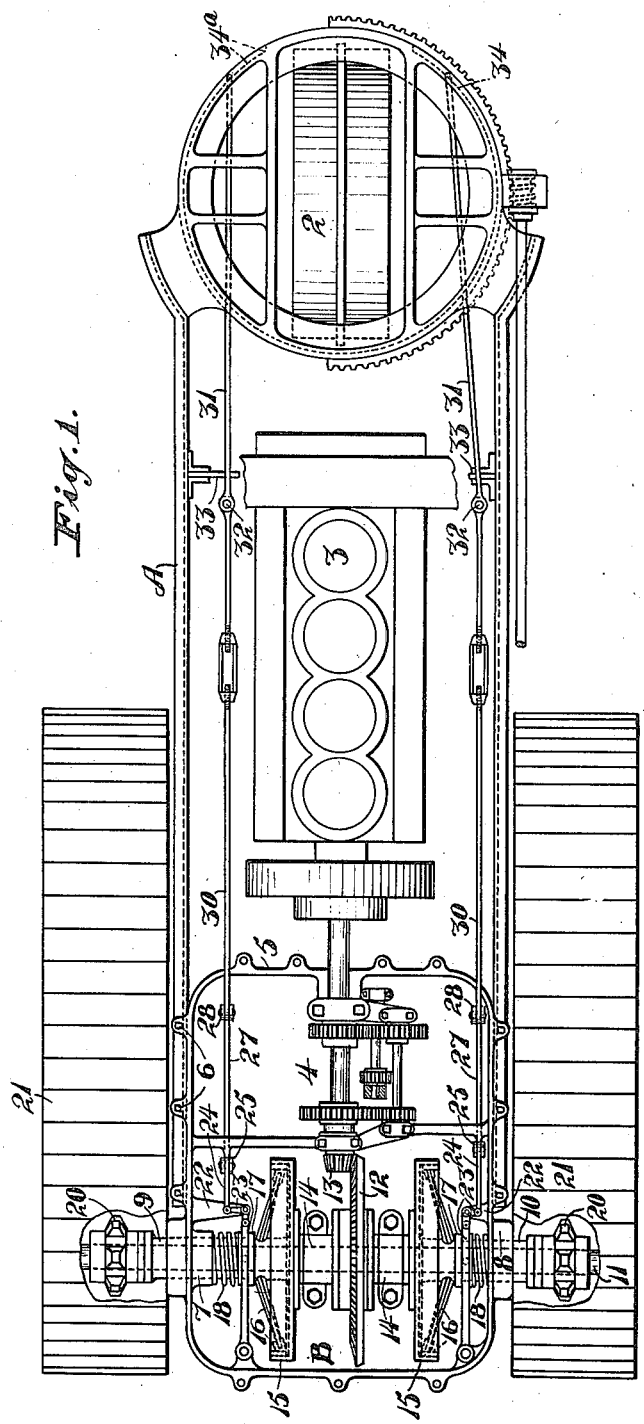
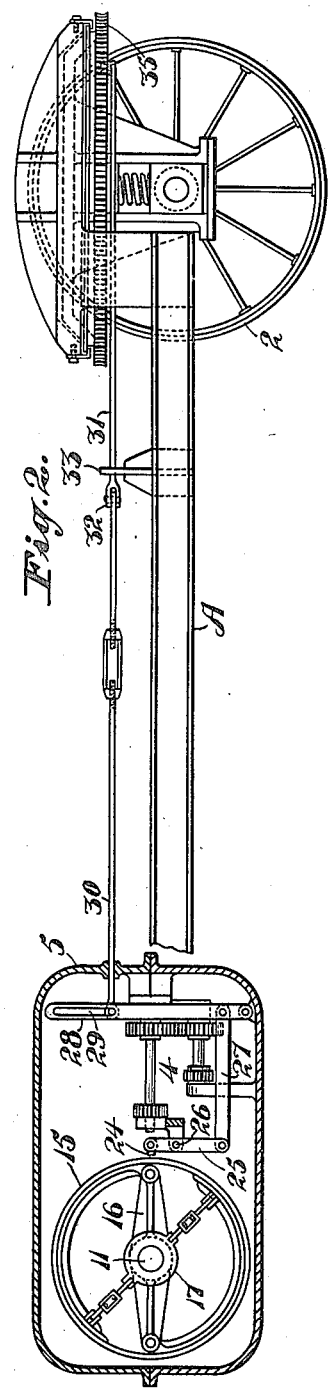
Inventor
Martin E. Roze
By Strong & Townsend
Attorneys

UNITED STATES PATENT OFFICE.

MARTIN E. ROZE, OF STOCKTON, CALIFORNIA.

AUTOMATIC STEERING CONTROL.

1,294,174.  Specification of Letters Patent.  Patented Feb. 11, 1919.

Application filed September 1, 1917. Serial No. 189,369.

*To all whom it may concern:*

Be it known that I, MARTIN E. ROZE, a citizen of the United States, residing at Stockton, in the county of San Joaquin and State of California, have invented new and useful Improvements in Automatic Steering Controls, of which the following is a specification.

This invention relates to automatic steering controls for tractors.

The object of the present invention is to provide a simple, compact transmission mechanism for tractors through which power from the engine may be transmitted to either or both the tractors in unison whether traveling ahead, or reverse, and in conjunction therewith to provide a steering wheel and a mechanism connected therewith which will automatically release either tractor with relation to the transmission when making a turn. Further objects will hereinafter appear.

The invention consists of the parts and the combination and construction of parts as hereinafter more fully described and claimed, having reference to the drawings, in which—

Figure 1 is a plan view of the tractor.

Fig. 2 is a side elevation of same partly in section and partly broken away.

Referring to the drawings in detail, A indicates the main frame of the tractor; 2 the front steering wheel; 3 the engine; 4 a standard form of transmission through which variable speeds ahead and a single speed reverse may be transmitted. Inclosing said transmission and a steering transmission generally indicated at B, is a housing 5, which is supported on the rear end of the main frame and secured thereto by bolts 6, or other suitable means. Extending crosswise of the housing and journaled in bearings 7 and 8 formed therein, is a pair of sleeve shafts 9 and 10, and extending through said sleeves is a driving shaft 11 upon which is secured a bevel gear 12 which remains in constant mesh with the driving pinion 13 secured upon the main shaft of the transmission indicated at 4.

Positioned on each side of the bevel gear 12 is a pair of intermediate bearings 14 and secured on the shaft 11 adjacent each bearing 14 is a cone clutch member 15. Slidably mounted on a feather on each sleeve shaft is a coöperating cone 16, and secured to each cone is a shifting collar 17 between which and the bearings 7—8 are interposed coil springs 18. These springs normally serve the function of holding the cones in engagement with their coöperating clutch members 15, and thereby permit power to be transmitted from the transmission 4 and the gears 13—12 to drive the sleeve shafts 9 and 10 in unison.

Suitably secured on the outer end of each sleeve shaft is a sprocket pinion 20 and suitably supported with relation to the main frame A and adapted to be driven by the sprockets 20 is a pair of tractors 21; one being arranged on each side of the frame. These tractors may be of the self-laying track type, or standard traction wheels may be employed.

Pivotally mounted on bracket extensions 22 formed forward of each main bearing 7 and 8 is a shifting fork 23. These forks engage the shifting collars 17 and are provided for the purpose of throwing the cones into and out of engagement with their coöperating clutches 15. Each fork 23 has a shape similar to a bell-crank and each fork is connected through a link 24 with a lever 25, which is pivotally mounted as at 26 and in turn connected through a link 27 with a lever 28, there being one set of levers and links within the housing on each side thereof and connected each to a shifting fork 23.

The upper end of each lever 28 is slotted as at 29 and said slotted ends are each connected through adjustable rods 30 with a second set of links 31. The connection between the rods 30 and links 31 as shown at 32, permits a pivotal movement, and each set of rods and links may be suitably supported with relation to the main frame A, or as here shown by slotted brackets 33.

The forward end of each link 31 is bent upwardly to permit the same to enter a slot 34 formed in the movable platform section 35 of the steering wheel. These slots are so arranged that a certain freedom of movement is permitted. That is, the steering wheel may be turned to one side or another without transmitting movement to the links 31, but further movement of the wheel causes the ends of the slots 34 to engage the links and force the same together with the rod connections rearwardly a sufficient distance to rock the levers 28—25 together with the shifting forks 23; it being understood that only one set of levers and links is operated when turning. For instance, if the steering wheel is turned to the left it can readily be seen that the end of slot 34ª will engage the link 31 positioned on the left-hand side of the frame, thereby causing the clutch on the left-hand side to be thrown out of engagement, and the self-laying track or traction wheel driven thereby to be thrown out of engagement with the transmission or freed with relation to same, thus permitting the tractor on this side to idle while the opposite wheel is driving.

A shorter turn can be made in this manner and the transmission together with the frame as a whole is entirely relieved of any strain. It is furthermore obvious that a differential may be entirely eliminated and that the construction and cost of manufacture can be considerably reduced.

The materials and finish of the several other parts of the mechanism may otherwise be such as the experience and judgment of the manufacturer may dictate.

Having thus described my invention what I claim and desire to secure by Letters Patent is—

1. The combination with the steering wheel and the driving members on a tractor of a transmission connected with the driving members through which power from an engine on the tractor is transmitted to drive the driving members, a clutch interposed between each driving member and the transmission, means for normally holding each clutch in engagement, a shifting fork connected with each clutch adapted to throw each clutch out of engagement, a fifth wheel turnably mounted on the tractor in which the steering wheel is journaled, said fifth wheel having a pair of arcuate slots formed thereon, one on each side of the steering wheel, a rod slidably mounted on each side of the steering wheel, one end of each of said rods having an extension projecting into its respective slot, a rod pivotally attached to the opposite end of each first-named rod and a connection between the opposite end of each second-named rod and each shifting fork.

2. The combination with the steering wheel and the driving members on a tractor of a transmission connected with the driving members through which power from an engine on the tractor is transmitted to drive the driving members, a clutch interposed between each driving member and the transmission, means for normally holding each clutch in engagement, a shifting fork connected with each clutch adapted to throw each clutch out of engagement, a fifth wheel turnably mounted on the tractor in which the steering wheel is journaled, said fifth wheel having a pair of arcuate slots formed thereon, one on each side of the steering wheel, a rod slidably mounted on each side of the steering wheel, one end of each of said rods having an extension projecting into its respective slot, a rod pivotally attached to the opposite end of each first-named rod, a pair of levers, one connected to the opposite end of each second-named rod, a bell crank connected with each shifting fork and a connection between each lever and the bell crank.

3. The combination with the steering wheel and the driving members of a tractor, of a transmission connected with the driving members, through which power from an engine on the tractor is transmitted to drive the driving members, a clutch interposed between each driving member and the transmission, means for normally holding each clutch in engagement, a fifth wheel turnably mounted on the tractor in which the steering wheel is journaled, said fifth wheel having a pair of arcuate slots formed thereon, one on each side of the steering wheel, rods slidably mounted, one on each side of the tractor, means on the forward end of each rod projecting into the respective arcuate slot to transmit movement of the steering wheel to the rods, and a connection between each rod and each clutch to throw one clutch or the other out of engagement.

4. In a tractor, a driving shaft, a sleeve shaft turnably mounted on each end of the driving shaft, a clutch for each sleeve adapted to connect or disconnect the sleeve with relation to the driving shaft, a driving member secured on each sleeve, a motor on the tractor, a transmission interposed between the motor and the driving shaft through which power may be transmitted to drive the driving shaft either ahead or reverse, a steering wheel, a fifth wheel in which the steering wheel is journaled, means for turning the fifth wheel and the steering wheel to steer the tractor, means for normally holding each clutch in engagement, a shifting fork connected with each clutch adapted to throw each clutch out of engagement, a rod slidably mounted on each side of the tractor, a pair of arcuate slots formed in the fifth wheel, one on each side of the steering wheel, a rod pivotally attached to the opposite end of each first-named rod and a projection on each second-named rod, one of said projections extending into the arcuate slot on one side of the steering wheel and the other projection on the other rod extending into the arcuate slot on the opposite side of the steering wheel, said slots having a limited length to permit the end of one slot to engage a coöperating rod projection when the steering wheel is turned in one direction to throw out one clutch and to throw out the other clutch when the steering wheel is swung in the opposite direction.

5. The combination with the steering wheel and the driving members on a tractor, of a transmission connected with the driving members through which power from an engine on the tractor is transmitted to drive the driving members, a clutch interposed between each driving member and the transmission, means for normally holding each clutch in engagement, a shifting fork connected with each clutch adapted to throw each clutch out of engagement, a fifth wheel turnably mounted on the tractor, a steering wheel journaled in said fifth wheel, said fifth wheel having a pair of arcuate slots formed thereon, one on each side of the steering wheel, rods slidably mounted one on each side of the tractor, a link pivotally connected with the forward end of each rod, a projection on the forward end of each link extending into each arcuate slot, and a connection between the opposite end of each rod and each shifting fork to throw one or the other of the clutches out of engagement.

In testimony whereof I have hereunto set my hand in the presence of two subscribing witnesses.

MARTIN E. ROZE.

Witnesses:
 JOSEPH A. ROSE,
 MARGARET KING.